Figure 1:
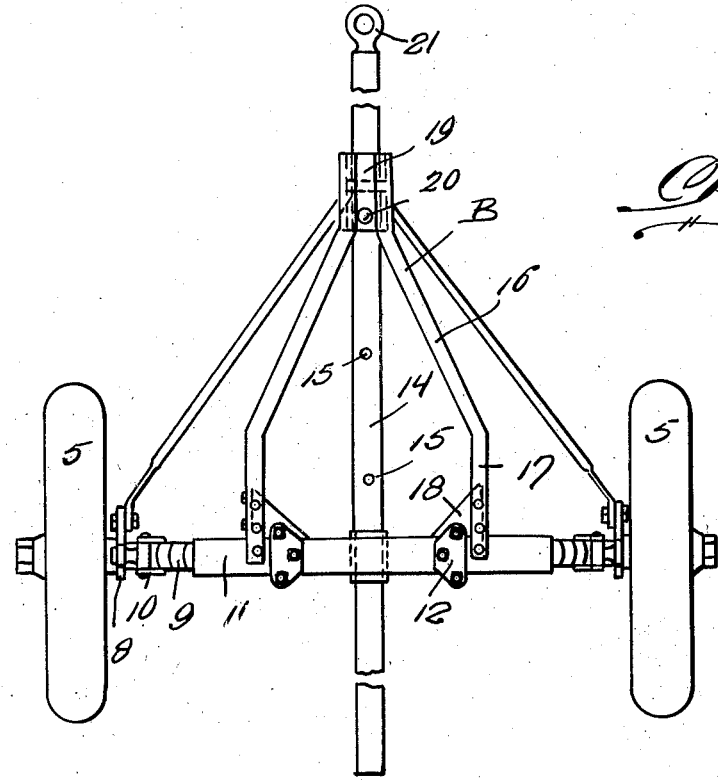

Aug. 31, 1926.

C. H. KINGHAM ET AL 1,598,084

TRUCK AND TRACTOR TRAILER

Filed Feb. 28, 1925   2 Sheets-Sheet 1

Inventor
C. H. Kingham
S. D. Mayes,

By

Attorney

Aug. 31, 1926. 1,598,084
C. H. KINGHAM ET AL
TRUCK AND TRACTOR TRAILER
Filed Feb. 28, 1925 2 Sheets-Sheet 2
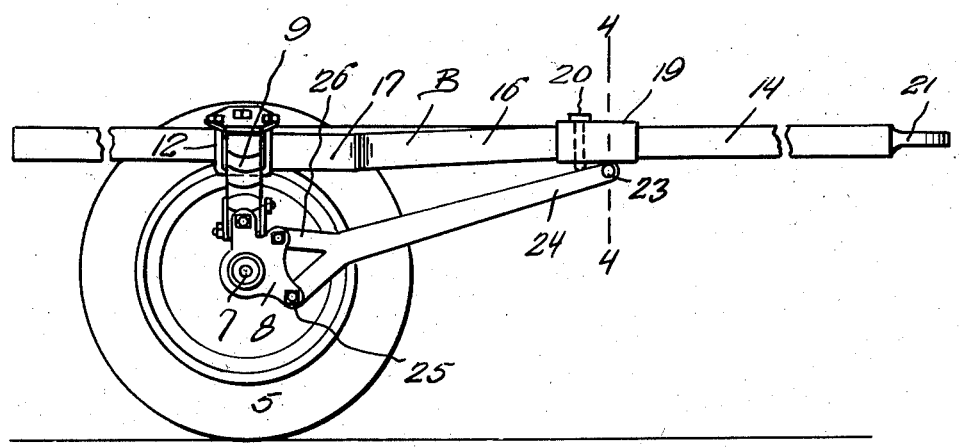
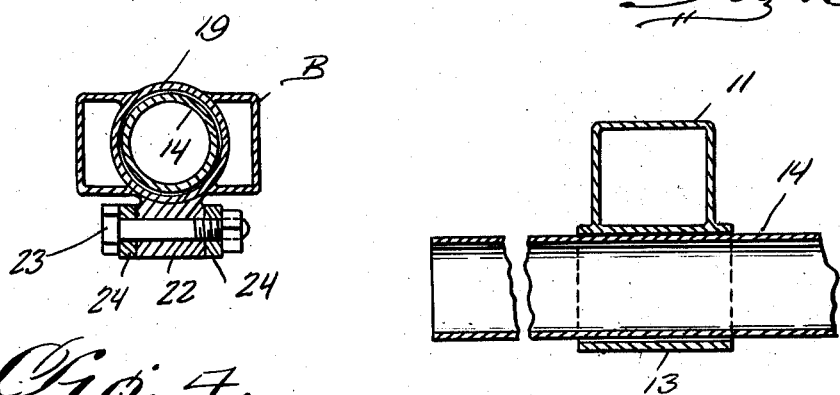
Inventor
C. H. Kingham,
S. D. Mayes,
By
Attorney Patented Aug. 31, 1926.

1,598,084

UNITED STATES PATENT OFFICE.

CHARLES H. KINGHAM AND STEPHEN D. MAYES, OF WAGONER, OKLAHOMA.

TRUCK AND TRACTOR TRAILER.

Application filed February 28, 1925. Serial No. 12,327.

The present invention appertains to a trailer for trucks and tractors and has for its principal object to provide a device of this nature which is strong, durable, inexpensive to manufacture, simple in construction, efficient and reliable in operation, not liable to readily become out of order, and otherwise well adapted to the purpose for which it is designed.

Another very important object of the invention is to provide a trailer of this nature in which the active length of the coupling pole may be varied as may be desired, depending upon the use to which the trailer is being put.

A still further very important object of the invention is to provide a trailer structure which may be easily and readily assembled and disassembled.

With the foregoing and other objects in view as will appear as the description proceeds, the invention resides in certain novel features of construction, and in the combination and arrangement of parts as will be hereinafter more fully described and claimed.

In the drawing—

Figure 2:
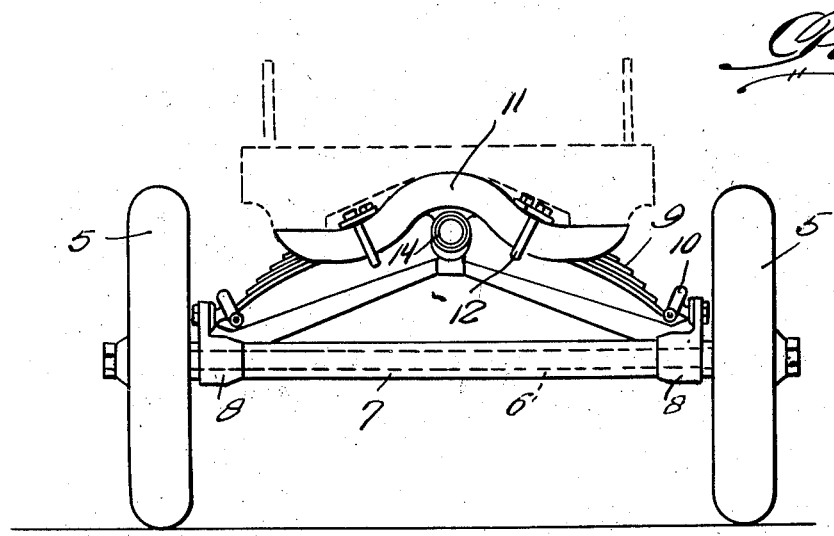

Figure 1 is a top plan view of the trailer embodying the features of my invention, Fig. 2 is a rear elevation thereof, Fig. 3 is a side elevation thereof with one wheel removed, Fig. 4 is a detail transverse section taken on an enlarged scale on the line 4—4 of Fig. 3, and Fig. 5 is an enlarged detail section through the cross member and a portion of the coupling pole.

Referring to the drawing in detail it will be seen that 5 designates a pair of automobile or truck wheels of suitable structure which are mounted on an axle 6 extending through a tubular housing 7. Sleeve brackets 8 are fixed to the tubular housing 7 adjacent its ends between the wheels 5 for engagement with quarter elliptical springs 9 through suitable shackles 10.

A cross member 11 has its ends fixed to the upper ends of the quarter elliptical springs 9 by means of U-bolts or clamps 12 or in any other suitable manner. As is shown to advantage in Fig. 5, the intermediate portion of the cross member 11 is provided with a sleeve 13 through which is slidable for adjustment a coupling pole 14 which is provided with a plurality of spaced transversely extending openings 15.

A substantially V-shaped brace member indicated generally by the letter B includes a pair of diverging sides 16 terminating at their ends in parallel extensions 17 which are attached to the cross member 11 and braced securely thereto as at 18 in any suitable or well-known manner. The apex of the brace member B is in the form of a sleeve 19 through which is slidable the coupling pole 14. This sleeve is provided with a transverse opening through which is extended a pin 20 for engaging in the openings 15 whereby the active length of the coupling pole may be varied as desired.

The forward end of the coupling pole is in the form of an eye clevis 20. An apertured lug 22 is depended from the sleeve 19 and its opening extends transversely of the sleeve for the reception of a bolt 23 for pivotally engaging the ends of radius rods 24, the rear ends of which are attached to the brackets 8 as at 25. As shown in the present embodiment the rear ends of the radius rods are bifurcated as at 26.

From the above detailed description, it will be seen that a very inexpensive trailer may be constructed in accordance with the idea of this invention and that the same will be strong, durable, and well adapted to the purpose for which it is designed.

It will be apparent that the present embodiment of the invention which we have described in detail, has been given merely by way of example and that numerous changes in the details of construction, and in the combination and arrangement of parts may be resorted to without departing from the spirit or scope of the invention as hereinafter claimed or sacrificing any of its advantages.

Having thus described our invention, what we claim as new is:—

In a trailer, an axle housing spring supporting brackets on the housing, quarter elliptical springs shackled to the brackets, a cross member fixed to the springs, a sleeve supported by the cross members, a V-shaped brace member having its ends fixed to the cross member to extend forwardly thereof, the apex of the brace member being in the form of a sleeve, a coupling pole extending through the sleeves, means for fixing the coupling pole to the second mentioned sleeve, a lug formed on the second mentioned sleeve and provided with an opening extending transversely of said last mentioned sleeve, a bolt extending through the bore of said lug, radius rods pivoted on said bolt at one of their ends and at their other ends fixed to the brackets.

In testimony whereof we affix our signatures.

CHARLES H. KINGHAM.
STEPHEN D. MAYES.